United States Patent [19]
Liu

[11] Patent Number: 6,007,207
[45] Date of Patent: Dec. 28, 1999

[54] REAR VIEW MIRROR ACCESSORY

[76] Inventor: Warren S. Liu, 7500 Lilla Pl., West Hills, Calif. 91304

[21] Appl. No.: 08/782,426

[22] Filed: Jan. 15, 1997

[51] Int. Cl.[6] .............................. G02B 5/08; G02B 7/182; B60R 1/06

[52] U.S. Cl. ......................... 359/855; 359/866; 359/871; 359/872; 359/854; 248/475.1; 248/479; 248/481

[58] Field of Search .................... 359/850, 854, 359/855, 864, 865, 866, 871, 872; 248/475.1, 488, 479, 481

[56] References Cited

U.S. PATENT DOCUMENTS

| | | | |
|---|---|---|---|
| D. 219,337 | 12/1970 | Monos . | |
| D. 220,480 | 4/1971 | Kesler . | |
| D. 239,932 | 5/1976 | Kim . | |
| 1,872,905 | 8/1932 | Darling . | |
| 2,663,224 | 12/1953 | Younglove | 359/865 |
| 2,857,810 | 10/1958 | Troendle . | |
| 3,881,811 | 5/1975 | French . | |
| 4,019,812 | 4/1977 | Carnine | 359/866 |
| 4,025,173 | 5/1977 | Schmaedeke | 359/855 |
| 4,264,144 | 4/1981 | McCord . | |
| 4,331,382 | 5/1982 | Graff . | |
| 4,890,908 | 1/1990 | Casey | 359/865 |
| 4,906,088 | 3/1990 | Casey | 359/865 |
| 4,932,770 | 6/1990 | Caravaty | 359/866 |
| 5,165,081 | 11/1992 | Drumheller | 359/865 |
| 5,198,938 | 3/1993 | Ward | 359/866 |
| 5,280,391 | 1/1994 | Peinovich | 359/862 |
| 5,594,594 | 1/1997 | Ung | 359/855 |

FOREIGN PATENT DOCUMENTS

| | | | |
|---|---|---|---|
| 3033670 | 4/1982 | Germany | 359/866 |

*Primary Examiner*—Ricky D. Shafer
*Attorney, Agent, or Firm*—Sheldon & Mak

[57] ABSTRACT

A rear view mirror combination is particularly suitable for monitoring obstructions in typical blind spot locations as well as directly to the rear. An accessory for a rear view mirror includes a base for mounting to a structure that supports a main mirror nominally oriented in a main reflection plane; a first auxiliary mirror mounted to the base and extending generally vertically relative to the structure and vertically offset from the main rear view mirror, the first auxiliary mirror is angled outwardly between approximately 25 degrees and approximately 50 degrees from the main reflection plane. The base can have a vertically projecting face portion for fastening to a forwardly facing surface of the structure, or a generally downwardly facing face portion for fastening to an upwardly facing surface of the structure. The accessory can include a second auxiliary mirror mounted to the base, the first and second auxiliary mirrors forming a dihedral angle of between 155 degrees and 175 degrees, the first auxiliary mirror being angled from about 20 to about 40 degrees outwardly with respect to the main mirror. In a further aspect, the invention provides a method for visually monitoring obstructions relative to a vehicle being driven.

9 Claims, 2 Drawing Sheets

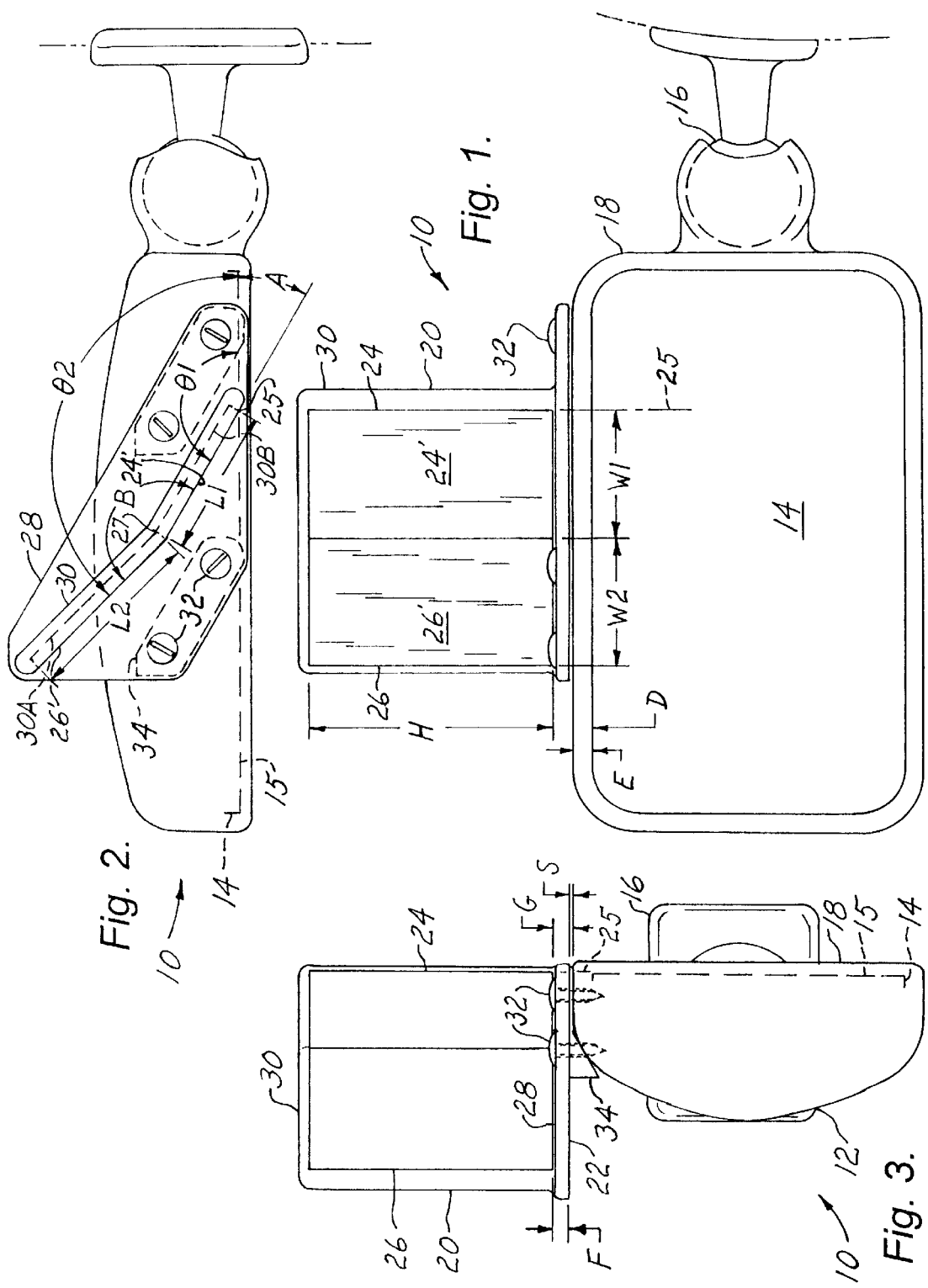

REAR VIEW MIRROR ACCESSORY

BACKGROUND

The present invention relates to rear view mirrors for vehicles, and more particularly to mirrors having extended fields of view.

Mirrors and mirror assemblies having extended fields of view are known, including cylindrically, spherically, and ellipsoidally curved mirrors, and combinations of such mirrors with a planar mirror. It is also known to provide interior vehicle rear-view mirrors having a lateral series of planar mirrors that are mounted with progressively angled orientations. These mirrors of the prior art are not entirely satisfactory for use as vehicle rear-view mirrors, and especially outside rear-view mirrors. For example:

1. Laterally spaced multiple mirrors are unsuitable for use as outside mirrors in that excessive side clearance is required if the elements are to have sufficient size to provide a reasonable field of view per element;

2. Existing multiple planar element mirrors would be unsuitable for side viewing even if outside clearance were not a factor, in that each mirror blocks the lateral field of the next inner mirror, and the housing connecting the mirrors blocks the lateral field of the farthest mirror; and 3. Curved mirrors in any form, and even when used in combination with planar mirrors, introduce distortion, the distortion being quite dangerous if the curvature were to be sufficient to provide both rear and side viewing using a single mirror element.

Thus there is a need for an outside rear-view mirror that is suitable for both rear and side viewing, and that overcomes the disadvantages of the prior art.

SUMMARY

The present invention meets this need by providing a vehicle outside rear-view mirror that is particularly effective for both rear and side viewing. In one aspect of the invention, a mirror accessory for a main rear-view mirror has a base for mounting to a structure of the main mirror, and at least one auxiliary mirror that is angled from about 25 to about 50 degrees outwardly with respect to the main mirror and located above the structure when the accessory is attached thereto. The accessory can include a spacer having a wedge-shaped contour portion for interposing between the base and the structure. Preferably, the accessory includes a pair of auxiliary mirrors that are horizontally adjacent and forming a dihedral angle of between 155 degrees and 175 degrees, a first one of the mirrors being angled from about 20 to about 40 degrees outwardly with respect to the main mirror and located above the structure when the accessory is attached thereto.

The accessory can be in combination with a main mirror fixture that includes the main mirror and the structure therefor. The combination can further include the spacer, and a plurality of threaded fasteners connecting the base to the structure, the fasteners extending through the spacer. The combination can further include an adhesive connecting the base to the structure.

In a further aspect, the invention provides a method for visually monitoring obstructions relative to a vehicle being driven.

DRAWINGS

These and other features, aspects, and advantages of the present invention will become better understood with reference to the following description, appended claims, and accompanying drawings, where:

FIG. 1 is a rear elevational view of a main mirror in combination with a mirror accessory according to the present invention;

FIG. 2 is a plan view of the mirror combination of FIG. 1;

FIG. 3 is a left side elevational view of the combination of FIG. 1; and

DESCRIPTION

Figure 4:
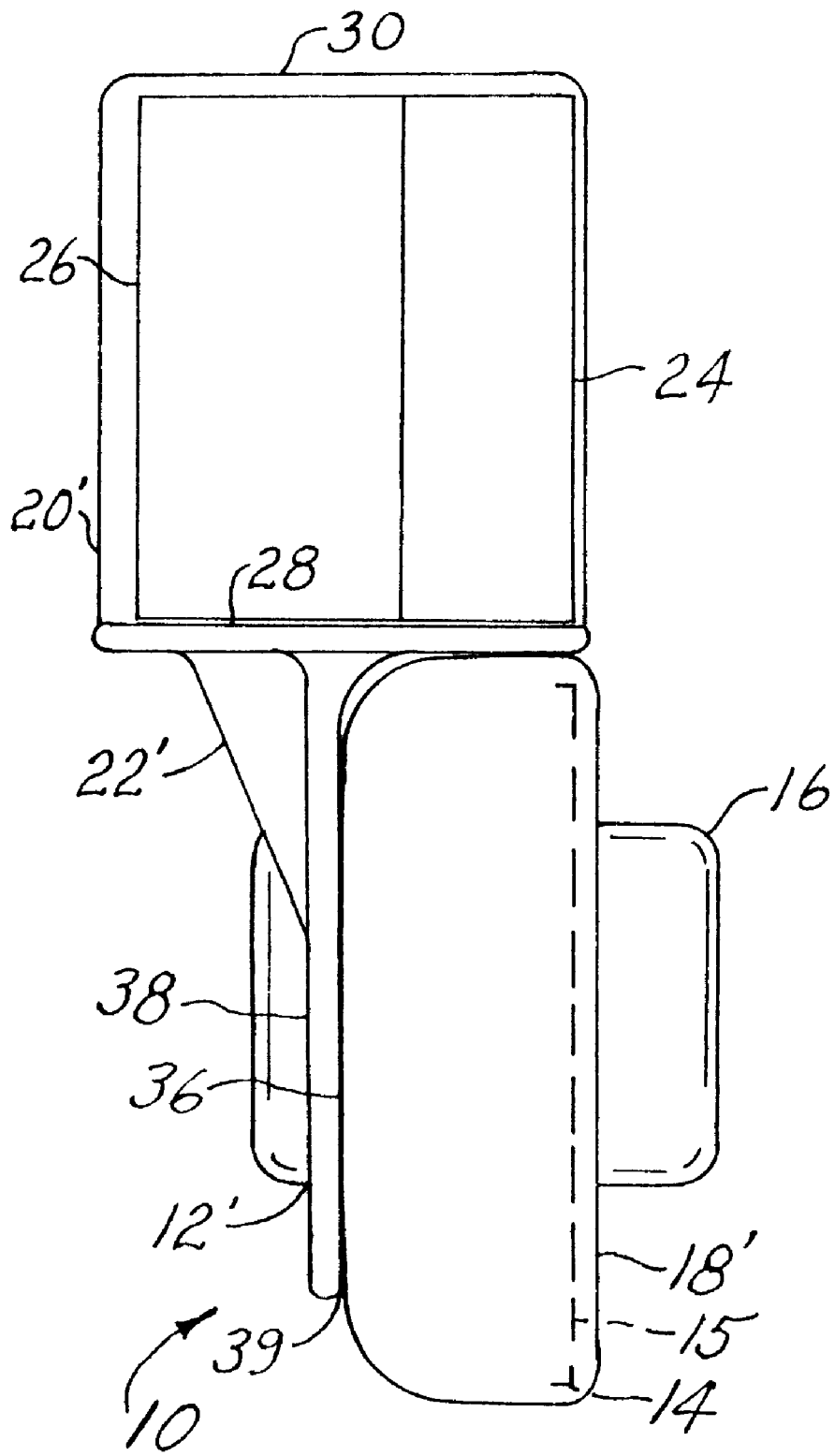
FIG. 4 is an elevational view as in FIG. 3, showing an alternative configuration of the combination of FIG. 1.

The present invention is directed to a vehicle rear view mirror apparatus that is particularly effective in monitoring potential hazards located to the side as well as to the rear of the vehicle. With reference to FIGS. 1–3 of the drawings, a mirror apparatus 10 for a vehicle includes a conventional rear view mirror fixture 12 having a main mirror 14. The main mirror 14 is oriented generally vertically in a main reflection plane 15 that can be positioned relative to the vehicle using an adjustable mount 16 of the mirror fixture 12.

In an exemplary configuration as shown in FIGS. 1–3, the main mirror 14 is fixably mounted in a structure 18 to which the adjustable mount 16 is connected. It will be understood that the main mirror 14 can be adjustably mounted within the structure 18, such as by conventional remote controls. In that case, the main reflection plane 15 is defined at a nominal orientation of the main mirror 14 relative to the structure 18. It will be further understood that the main mirror 14 need not be exactly planar, the main reflection plane 15 being defined relative to a central portion of the main mirror 14.

According to the present invention, the mirror apparatus 10 includes a mirror accessory 20 having a base 22 for connection to the structure 18, at least one auxiliary mirror being supported generally vertically oriented and turned at an angle to the main reflection plane 15 for facilitating the simultaneous viewing of potential hazards to the rear of the vehicle using the main mirror 14 and other hazards as might be displaced laterally from the rear of the vehicle 11 using the auxiliary mirror. Preferably there are two auxiliary mirrors, designated first auxiliary mirror 24 and second auxiliary mirror 26, the mirrors 24 and 26 having respective reflective surfaces 24' and 26'. The reflective surfaces 24' and 26' are each segments of respective planes that intersect the main reflection plane 15, forming respective dihedral angles θ1 and θ2 with the main reflective surface 15. As shown in FIG. 2, the dihedral angle θ1 is the complement of an angle A to which the first auxiliary mirror 24 is turned relative to the main reflection plane 15. More particularly, the dihedral angle θ1 is about a first dihedral axis 25 that extends approximately vertically in the main reflection plane 15. (In the drawings, the first dihedral axis 25 is shown extending along an inboard, front extremity of the first auxiliary mirror 24.)

The auxiliary mirrors 24 and 26 are positioned in edge adjacency and oriented to form a base dihedral angle B between reflective surfaces thereof, each of the dihedral angles θ1, θ2, and B being less than 180° and measured behind the main reflective surface 15. Preferably the mirrors 24 and 26 each extend to proximate a base dihedral axis 27 of the dihedral angle B, so that neither of the auxiliary mirrors 24 and 26 interferes to any extent with a field of view of the other auxiliary mirror.

The base 22 includes a platform portion 28 that extends horizontally over a portion of the structure 18, and an upstanding wall portion 30 that forms respective mounting surfaces 30A and 30B for the auxiliary mirrors 24 and 26. The base 22 is fastened to the structure 18 by a plurality of threaded fasteners 32, the fasteners 32 extending through the platform portion 28 and a spacer 34, the spacer 34 providing conformance to an upper contour portion of the structure 18. As shown in the drawings, there are four of the fasteners 32 and two of the spacers 34, two of the fasteners 32 extending through each of the spacers 34. In practice, a plurality of differently configured counterparts of the spacers 34 would be packaged with each of the mirror accessories 20, for convenience in use with main mirror fixtures 12 having different shapes.

With further reference to FIG. 4, an alternative configuration of the mirror accessory, designated 20', is configured for mounting to a counterpart of the main mirror fixture, designated 12', that provides a generally vertical front surface 36 of a structure 18'. The accessory 20' includes a counterpart of the base, designated 22', that has a face portion 38 that extends generally vertically below the platform portion 28 for fastening to the front surface 36 of the structure 18'. As shown in FIG. 4, the fastening is provided by a suitable adhesive 39 for bonding the base 22' to the structure 18'.

The auxiliary mirrors 24 and 26 can be formed of any suitable material, such as polished metal or silvered (or aluminized) glass, in which case a front-surfaced configuration is preferred for avoiding side edge obstructions. Suitable materials for the base 22 and the spacers 34 include metal and plastic.

Although the present invention has been described in considerable detail with reference to certain preferred versions thereof, other versions are possible. For example, the adhesive 39 can be used in place of the fasteners 32 in the configuration of FIGS. 1–3, the adhesive 39 being used also between the spacers 34 and the base 22. Conversely, the spacers 34 can be used in the configuration of FIG. 4, either with the fasteners 32 or the adhesive 39. Also, the auxiliary mirrors 24 and 26 can be formed integrally with the base 22. Therefore, the spirit and scope of the appended claims should not necessarily be limited to the description of the preferred versions contained herein.

What is claimed is:

1. An accessory for a rear view mirror having a structure for supporting a main mirror nominally oriented in a main reflection plane, the accessory comprising:
    (a) a base for mounting to the structure;
    (b) a first auxiliary mirror mounted to the base in a first mounting plane;
    (c) the auxiliary mirror extending generally vertically relative to the structure and vertically offset from the main mirror when the base is mounted to the structure, the first mounting plane and the main mirror forming segments of intersecting planes, the intersecting planes forming a first dihedral angle of between approximately 140 degrees and approximately 160 degrees;
    (d) a second auxiliary mirror mounted to the base in a second mounting plane, the first and second mounting planes forming a base dihedral angle of between 155 degrees and 175 degrees about a base dihedral axis, the base dihedral axis being generally parallel to the main reflection plane when the base is mounted to the structure, the second mounting plane forming a second dihedral angle with the main reflection plane, the second dihedral angle being less than the first dihedral angle, each of the first, second, and base dihedral angles being measured behind the main reflection plane.

2. The accessory of claim 1, wherein the base has a vertically projecting face portion for fastening to a forwardly facing surface of the structure.

3. The accessory of claim 1, wherein the base has a generally downwardly facing face portion for fastening to an upwardly facing surface of the structure.

4. The accessory of claim 1, further comprising a spacer having a wedge-shaped contour portion for interposing between the base and the structure.

5. The accessory of claim 1, in combination with a main mirror fixture, the main mirror fixture including the main mirror and the structure therefor.

6. The combination of claim 5, further comprising a spacer having a wedge-shaped contour portion, and a plurality of threaded fasteners connecting the base to the structure, the fasteners extending through the spacer.

7. The combination of claim 5, further comprising an adhesive connecting the base to the structure.

8. A method for visually monitoring obstructions relative to a vehicle being driven, the vehicle having a main rear view mirror and associated structure projecting laterally from the vehicle, the method comprising the steps of:
    (a) providing an accessory having first and second auxiliary mirrors mounted in respective first and second mounting planes, the first and second mounting planes forming a base dihedral angle of between 155 degrees and 175 degrees about a base dihedral axis;
    (b) connecting the accessory to the structure with the auxiliary mirrors extending generally vertically relative to the structure and vertically offset from the main rear view mirror with the base dihedral axis being generally parallel to the main rear view mirror, the first mounting plane and the main rear view mirror forming segments of intersecting planes, the intersecting planes forming a first dihedral angle of between approximately 140 degrees and approximately 160 degrees; and
    (c) simultaneously observing a main field of view rearwardly of the vehicle using the main rear view mirror and a pair of auxiliary fields of view laterally displaced from the main field of view using the auxiliary mirrors, thereby monitoring the fields of view for obstructions therein.

9. An accessory for a rear view mirror having a structure for supporting a main mirror nominally oriented in a main reflection plane, the accessory comprising:
    (a) a base for mounting to the structure;
    (b) a first auxiliary mirror mounted to the base and having a first reflective surface in a first reflection plane;
    (c) a second auxiliary mirror mounted to the base and having a second reflective surface in a second reflection plane, the first and second reflection planes forming a base dihedral angle about a base dihedral axis, the base dihedral angle being between 155 degrees and 175 degrees as measured behind the reflective surfaces of the auxiliary mirrors;
    (d) the first and second reflective surfaces extending to proximate the base dihedral axis for avoiding interference by either of the auxiliary mirrors with a field of view of the other auxiliary mirror; and (e) the base dihedral axis being generally parallel to the main reflection plane when the base is mounted to the structure, wherein the first reflective surface and the main mirror form segments of intersecting planes, the intersecting planes forming a dihedral angle of between approximately 140 degrees and approximately 160 degrees as measured behind the main and first reflection planes.

* * * * *